UNITED STATES PATENT OFFICE.

SAMUEL PEACOCK, OF CHICAGO, ILLINOIS, ASSIGNOR TO THE SOUTHERN ELECTROCHEMICAL COMPANY, OF NEW YORK, N. Y., A CORPORATION OF NEW JERSEY.

PROCESS OF MANUFACTURING NITRATE OF LIME AND DICALCIUM PHOSPHATE IN A SINGLE OPERATION.

1,057,876.   Specification of Letters Patent.   Patented Apr. 1, 1913.

No Drawing.   Application filed September 19, 1910.   Serial No. 582,777.

*To all whom it may concern:*

Be it known that I, SAMUEL PEACOCK, a citizen of the United States, residing at Chicago, in the county of Cook and State of Illinois, have invented certain new and useful Improvements in Processes of Manufacturing Nitrate of Lime and Dicalcium Phosphate in a Single Operation; and I do hereby declare the following to be a full, clear, and exact description of the invention, such as will enable others skilled in the art to which it appertains to make and use the same.

This invention relates to the manufacture of nitrate of lime and dicalcium phosphate in a single operation and has for its object the provision of a process which will produce the phosphate of lime in a form readily available as a phosphatic plant food.

Generally stated, the process consists in treating tricalcium phosphate when in the form of phosphate rock with gases or vapors containing nitric acid, all as will be now more fully hereinafter described and particularly pointed out in the claims.

As an example of carrying out my process, the procedure may be as follows:— Phosphate rock is ground to a fineness of about 40 mesh and is then charged into a closed tank, after being mixed with sufficient water to make a thin mud. If desired, a plurality of tanks may be used and so provided with pipes that the gases passing through the thin mud at the bottom of one tank will emerge from the top of the same and be then led by suitable piping into the bottom of the succeeding tank and so on until all the nitric acid in the vapors or gases has been dissolved. The construction of the apparatus being of a well known form, it is not here illustrated.

The end of the process will be determined, when all the free lime of the phosphate and one-third of the lime combined with the phosphoric acid is converted into lime nitrate substantially in accordance with the following:—

$$4HNO_3 + CaO + Ca_3P_2O_8 = 2CaN_2O_6 + 2CaHPO_4 + H_2O.$$

The dicalcium phosphate $CaHPO_4$ thus produced is insoluble in water, while the lime nitrate is soluble and therefore may be separated out by filtration. The dicalcium phosphate is recognized as a valuable fertilizer as it contains a compound of phosphoric acid in such a form that it is available as a plant food. The lime nitrate after having been separated out by filtration, concentrated and crystallized becomes a most desirable fertilizer, since it contains a comparatively large proportion of nitrogen and in a form suitable for assimilation by plant life. This lime nitrate may also be used as a base for the manufacture of nitrate of ammonia especially if it is allowed to suffer a double decomposition with sulfate of ammonia, and the insoluble sulfate of lime is separated out leaving a practically pure nitrate of ammonia in solution. This nitrate of ammonia of course may be readily crystallized to the commercial form.

The special utility of this process may be said to reside in the fact that the dilute nitric acid gases from the electric arc may be used, as it is not necessary to concentrate these gases for the reaction. The use of such gases of course saves a large item of expense in preparing nitric acid for the manufacture of nitrate of lime, and also by this treatment the phosphate is converted into a form available as a plant food and at practically no cost at all for the nitric acid used. Further, the combined nitric acid is just as valuable as a plant food in the form of nitrate of lime as it is in any other form. By the processes now in common use, on the other hand, it is well known that for every ton of phosphate rock acidulated so that its phosphoric acid becomes available as a plant food, one ton of sulfuric acid at 50° Baumé must be used. This sulfuric acid is converted into a sulfate of lime, and its cost often amounts to $5.00 or $6.00 per ton. By my method of treatment of phosphate rock, however, this cost is saved. Again, acid phosphate when made with sulfuric acid contains all the sulfate of lime that may be formed as a dead weight, and therefore said phosphate as a finished marketable product only averages from 14 to 16 per cent. available phosphoric acid. By my process, on the other hand, the resulting phosphate contains from 42 to 46 per cent. available phosphoric acid. In addition to the above, the average bagging and freight costs in the United States of distributing one ton of acid phosphate is $3.00, and as one ton of the material made by my process is equivalent in available phosphoric acid to three tons as made by the present process, the saving per ton is equivalent to a handsome profit.

A further advantage of my process resides in the fact that the phosphate it produces is not very acid, and it does not therefore destroy the sacks containing the same. Further, it may be mixed with any form of fertilizer materials without danger of losses. That is to say, acid phosphates as made at present cannot be compounded into a complete fertilizer with either nitrate of soda nor nitrate of lime, two of the most valuable forms of plant food nitrogen, without suffering considerable losses. Again, as is well known, acid phosphates as made at present are so acid and corrosive, that they effect a serious injury to germinating seeds with which they may come in contact in the soil. The available phosphate made by my process, on the other hand, has no such injurious action and may be mixed with the seed itself in planting without suffering any injurious effects at all. Again, the nitrate of lime made by my process costs less than by the present method of manufacturing and for the reason that no lime need be purchased for the reaction:—

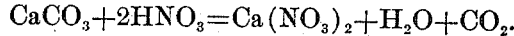
$$CaCO_3 + 2HNO_3 = Ca(NO_3)_2 + H_2O + CO_2.$$

In other words, in the old process, for every two equivalents of nitric acid one equivalent of carbonate of lime must be purchased, shipped and prepared for treatment, and my process eliminates this cost because the combined lime is taken from the rock phosphate.

What I claim is:—

1. The process of producing calcium nitrate and dicalcium phosphate in a single operation and in forms suitable for plant foods, which consists in finely dividing phosphate rock containing tricalcium phosphate and free lime; immersing said finely divided rock in water; and blowing gases containing nitric acid through said water until substantially all of said free lime and one-third of the chemically combined calcium in the tricalcium phosphate is converted into calcium nitrate, substantially as described.

2. The process of producing calcium nitrate and dicalcium phosphate in a single operation and in forms suitable for plant foods, which consists in finely dividing phosphate rock containing tricalcium phosphate and free lime; immersing said finely divided rock in water; blowing gases containing nitric acid through said water until substantially all of said free lime and one-third of the chemically combined calcium in the tricalcium phosphate is converted into calcium nitrate; and in suitably separating the said nitrate from the dicalcium phosphate thus formed, substantially as described.

In testimony whereof, I affix my signature, in presence of two witnesses.

SAMUEL PEACOCK.

Witnesses:
  A. H. BURROUGHS,
  L. A. HAMMERSLEY.